(12) United States Patent
Peddada et al.

(10) Patent No.: US 10,951,406 B2
(45) Date of Patent: Mar. 16, 2021

(54) PREVENTING ENCRYPTION KEY RECOVERY BY A CLOUD PROVIDER

(71) Applicant: salesforce.com, inc., San Francisco, CA (US)

(72) Inventors: Prasad Peddada, Alameda, CA (US); Taher ElGamal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 381 days.

(21) Appl. No.: 15/879,265

(22) Filed: Jan. 24, 2018

(65) Prior Publication Data

US 2019/0229908 A1 Jul. 25, 2019

(51) Int. Cl.
*H04L 29/06* (2006.01)
*H04L 9/08* (2006.01)
*G06F 12/14* (2006.01)
*G06F 21/62* (2013.01)
*H04L 9/30* (2006.01)
*H04L 9/06* (2006.01)
*G06F 21/60* (2013.01)

(52) U.S. Cl.
CPC ........ *H04L 9/0894* (2013.01); *G06F 12/1408* (2013.01); *G06F 21/602* (2013.01); *G06F 21/606* (2013.01); *G06F 21/6209* (2013.01); *G06F 21/6218* (2013.01); *H04L 9/0618* (2013.01); *H04L 9/3013* (2013.01); *H04L 63/045* (2013.01); *H04L 63/061* (2013.01); *G06F 2212/1052* (2013.01); *G06F 2221/2107* (2013.01)

(58) Field of Classification Search
CPC combination set(s) only.
See application file for complete search history.

(56) References Cited

U.S. PATENT DOCUMENTS

| 8,782,804 B2* | 7/2014 | Nagai | G06F 21/44 726/28 |
| 10,185,509 B1* | 1/2019 | Farhan | G06F 3/0674 |
| 2005/0141718 A1* | 6/2005 | Yu | H04L 9/0894 380/277 |
| 2006/0282662 A1* | 12/2006 | Whitcomb | H04L 63/0884 713/156 |
| 2007/0005974 A1* | 1/2007 | Kudou | H04L 9/0861 713/171 |

(Continued)

*Primary Examiner* — Phy Anh T Vu
(74) *Attorney, Agent, or Firm* — Holland & Hart LLP

(57) ABSTRACT

Methods, systems, and devices for encryption key storage are described. An application server may store an encryption key in volatile memory and access the key directly from the volatile memory when performing an encryption process. In some cases, a user may supply the encryption key to the application server on demand. Accordingly, when the application server is restarted, the encryption key may be purged from the memory. In some cases, the encryption key may be wrapped in a public key, and the application server may derive a private key to decrypt the public key-encrypted information to access the encryption key and store it in the volatile memory. Additionally or alternatively, the user may supply a first fragment of the encryption key, and the application server may derive the encryption key from the first fragment and a second fragment of the encryption key retrieved from a database.

19 Claims, 12 Drawing Sheets

(56) References Cited

U.S. PATENT DOCUMENTS

| | | | | |
|---|---|---|---|---|
| 2007/0100913 A1* | 5/2007 | Sumner | ............... | G06F 21/6227 |
| 2008/0002830 A1* | 1/2008 | Cherkasov | .............. | G06F 16/48 |
| | | | | 380/277 |
| 2012/0079288 A1* | 3/2012 | Hars | ....................... | G06F 21/00 |
| | | | | 713/193 |
| 2012/0140923 A1* | 6/2012 | Lee | ...................... | H04L 9/0894 |
| | | | | 380/45 |
| 2013/0212367 A1* | 8/2013 | Ingalls | .................... | G06F 21/88 |
| | | | | 713/2 |
| 2015/0363607 A1* | 12/2015 | Yang | ......................... | H04L 9/14 |
| | | | | 713/165 |
| 2016/0261408 A1* | 9/2016 | Peddada | ............... | H04L 9/0877 |
| 2018/0189501 A1* | 7/2018 | Ogawa | ................ | G06F 21/6227 |
| 2018/0341773 A1* | 11/2018 | Khatri | .................... | G06F 21/78 |
| 2018/0351928 A1* | 12/2018 | Yoo | ....................... | H04L 9/0894 |
| 2019/0095651 A1* | 3/2019 | Yokoi | ................... | G06F 3/0604 |
| 2019/0258778 A1* | 8/2019 | Park | ....................... | H04L 63/10 |
| 2020/0235919 A1* | 7/2020 | Boschini | ............... | H04L 9/0894 |

\* cited by examiner

PREVENTING ENCRYPTION KEY RECOVERY BY A CLOUD PROVIDER

FIELD OF TECHNOLOGY

The present disclosure relates generally to database systems and data processing, and more specifically to preventing encryption key recovery by a cloud provider (e.g., by storing encryption keys in volatile memory).

BACKGROUND

A cloud platform (i.e., a computing platform for cloud computing) may be employed by many users to store, manage, and process data using a shared network of remote servers. Users or tenants may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may be supported by a database system. Within the database system, one or more databases may support storing encrypted data records at rest. In addition to storing the encrypted data records, a tenant secret (e.g., an encrypted version of a database encryption key or a derivation component for an encryption key specific to an owner of the data records) may be stored in one or more of the databases. The tenant secret may be used to encrypt or decrypt the data records in the database system. However, storing the encryption key in one or more of the databases may compromise security for the encrypted data records. Additionally, the encryption key may be backed up in one or more additional databases (e.g., disaster recover (DR) databases), making it difficult to efficiently remove all instances of the encryption key from the database system when a tenant decides to obliterate the encryption key (e.g., a key deletion request).

DETAILED DESCRIPTION

Figure 1:
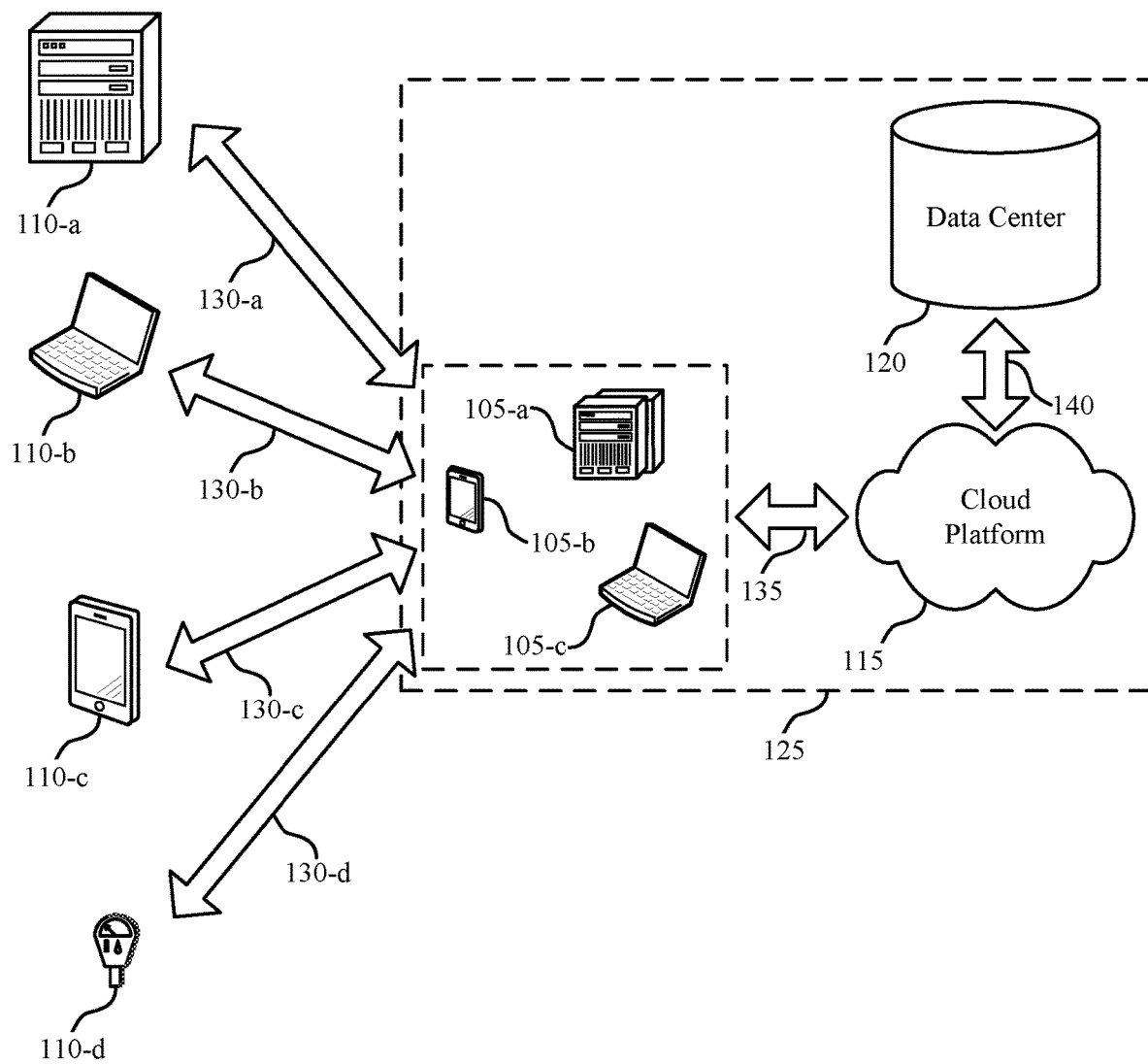
FIG. 1 illustrates an example of a system for encryption key storage at an application server that supports preventing encryption key recovery by a cloud provider (e.g., by storing an encryption key in volatile memory) in accordance with aspects of the present disclosure.

Some database systems may support encryption of data records at rest. To increase security of stored information, one or more databases may store data records as ciphertext, rather than plaintext. In some cases, in a multi-tenant database system, each tenant may select the data records to encrypt, and may further select an encryption key (e.g., a data encryption key) or encryption scheme for generating the ciphertext. In order to increase the security of the encrypted data records (e.g., ciphertext), an application server may store a tenant-specific data encryption key in non-persistent (e.g., volatile) memory for encrypting or decrypting the data records. The application server may access the data encryption key directly from the non-persistent memory, so that the data encryption key is never stored or backed up in persistent data storage. By not persisting the data encryption key or a corresponding tenant secret in the database system, the tenant may be confident that the data encryption key is destroyed whenever the application server restarts (e.g., restarting the application server may flush all data stored in volatile memory).

In some cases, the application server may utilize a public-private key cryptographic process for encrypting or decrypting the data records. For example, the tenant may access a public key, and may wrap the data encryption key in the public key for transmission to the application server. The application server may store this wrapped data encryption key in volatile memory (e.g., random access memory (RAM)), and may unwrap the data encryption key by decrypting with a private key. In order to determine the private key, the application server may receive an input from a security module to derive the private key. The application server may utilize the private key to decrypt the public key-encrypted data encryption key, which the application server may continue storing in the volatile memory. The application server may utilize the unwrapped data encryption key to perform one or more encryption processes. The public-private key cryptographic process may allow the database system to grant multiple tenants the ability to encrypt data encryption keys using public keys for enhanced data security, while only the database system may access the private keys used to decrypt the encrypted data encryption keys.

Additionally or alternatively, in some cases, the application server may utilize a key-splitting process for encrypting or decrypting the data records. For example, the tenant may supply a first fragment of a data encryption key to the application server. The application server may then retrieve a second fragment of the data encryption key from a security module and derive the full encryption key based on the two fragments. As discussed above, the application server may store the derived data encryption key—as well as at least the first fragment of the data encryption key—in non-persistent memory.

Aspects of the disclosure are initially described in the context of an environment supporting an on-demand database service. Further aspects of the disclosure are described with respect to encryption processes and a process flow for preventing encryption key recovery by a cloud provider (e.g., through an encryption key storage in volatile memory). Aspects of the disclosure are then further illustrated by and described with reference to apparatus diagrams, system diagrams, and flowcharts that relate to preventing encryption key recovery by a cloud provider.

FIG. 1 illustrates an example of a system 100 for cloud computing that supports preventing encryption key recovery by a cloud provider (e.g., through encryption key storage in volatile memory) in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security and/or disaster recovery purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, data center 120 may include one or more databases that support encryption at rest for stored data records or data objects. A cloud client 105 (e.g., a tenant or customer) may select an encryption policy for data stored in the database for that cloud client 105. For example, in some cases, the cloud client 105 may select specific data records or data types to be stored as plaintext or ciphertext, select an encryption key or key management policy (e.g., specifying a key rotation policy indicating one or more triggers or periodicities for rotating the encryption key), or select an encryption scheme (e.g., probabilistic encryption, deterministic encryption, etc.). In some cases, the cloud client 105 may additionally select whether to implement encryption key storage in volatile memory, or whether to allow encryption keys to be persisted in data center 120. A database in data center 120 may store data records according to the selected encryption policy. Additionally, the database in data center 120 may store the encryption key or a corresponding tenant secret for the cloud client 105.

However, storing the encryption key or tenant secret on a database for a cloud client 105 may compromise the security of the encrypted data records. For example, a malicious user may access the database and obtain the encryption key or tenant secret and be able to decrypt the data records in the database. In order to improve security and ensure that a malicious user may not obtain the encryption key or tenant secret, an application server for the cloud client 105 may store the encryption key in non-persistent memory (e.g., volatile memory) and may access the key directly from the non-persistent memory when performing an encryption process. By storing the encryption key in non-persistent memory, the application server may refrain from backing up the key (e.g., storing one or more copies) elsewhere in the database system for data recovery. Accordingly, the encryption key may not be stored anywhere in the database system in a persistent manner (e.g., on disc, tapes, etc.). As the data encryption key is stored in non-persistent memory, and not in persistent memory, when the application server is restarted or an application corresponding to the application server is closed, the application server may purge the encryption key from memory (e.g., according to aspects or policies of volatile memory), such that the key may not be available for subsequent encryption and/or decryption processes. In some cases, the encryption key may be wrapped in a public key, and the application server may derive a private key corresponding to the public key for use in unwrapping and accessing the encryption key. Alternatively, the cloud client 105 may supply a first fragment of the encryption key, and the application server may derive the encryption key from the first fragment and a second fragment of the encryption key retrieved from a database.

Figure 2:
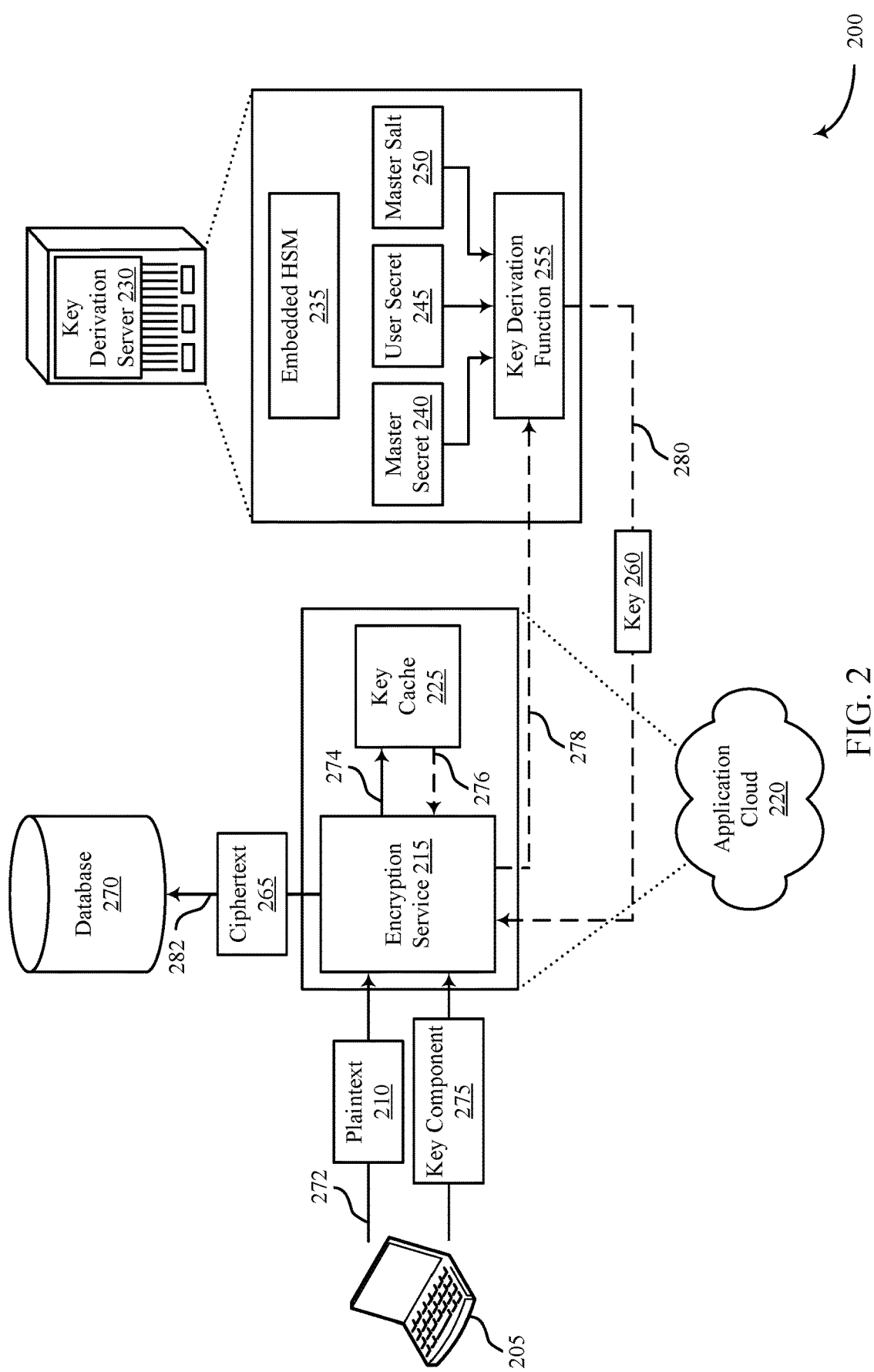
FIGS. 2 through 4 illustrate examples of encryption processes that support preventing encryption key recovery by a cloud provider in accordance with aspects of the present disclosure.

FIG. 2 illustrates an example of an encryption process 200 that supports preventing encryption key recovery by a cloud provider (e.g., by using volatile memory for handling encryption key storage) in accordance with various aspects of the present disclosure. Encryption process 200 may be initiated by a user device 205, which may be an example of a cloud client 105 or a contact 110 as described with reference to FIG. 1. User device 205 may send a data object to a database 270 to be stored. In some cases, the data object may include one or more plaintext data fields that are designated for encryption. The plaintext 210 may be encrypted in an application cloud 220 based on a key 260 generated by a key derivation server 230. In some case, database 270 and key derivation server 230 may be components of a data center 120 as described with reference to FIG. 1. Additionally or alternatively, key derivation server 230 may include a key derivation function. Encryption process 200 may convert plaintext 210 into ciphertext 265, and may store ciphertext 265 at database 270.

Database 270 may implement encryption to provide security for data at rest (i.e., data stored at database 270), and may not provide security for data being transmitted or received. In some cases, database 270 may additionally implement security for data being transmitted or received, such as transport layer security or message wrapping. In some cases, a user may turn encryption on or off, and may specify the data for encryption. Some examples of data a user may select to encrypt include personally identifiable information (PII), sensitive, confidential, or proprietary data, or any other data that the user wants to stop unauthorized users from accessing in database 270. In some cases, the encrypted data may be a data field within a data object, a data file, or an attachment.

In some cases, encryption process 200 may incur a tradeoff between data security and functionality. For example, a user may run functions on data objects in application cloud 220. However, some of these functions may not be designed to run on encrypted data. Encryption process 200 may be an example of probabilistic encryption (i.e., non-deterministic encryption, such as strong symmetric non-deterministic encryption), or may be an example of deterministic encryption. In some cases, probabilistic encryption may support less functionality than deterministic encryption, but may provide better data security. In one example, encryption process 200 may be probabilistic encryption utilizing the Advanced Encryption Standard (AES) with 256-bit keys. Encryption process 200 may additionally use cipher block chaining (CBC), Galois/Counter Mode (GCM), public key cryptography standards (PKCS) for padding (e.g., PKCS #5), a random initialization vector (IV), or any combination thereof.

At 272, user device 205 may send a data object to database 270 for storage. The data object may first be sent to application cloud 220, which may include an encryption service 215 and a key cache 225. In some cases, encryption service 215 and key cache 225 may be components of a database server, which may be a component of a data center 120, as described with reference to FIG. 1. The data object sent to encryption service 215 may include a set of data fields (e.g., an organization identifier field, a name field, a phone number field, a price field, etc.). In some cases, one or more of the data fields may be designated for encryption. For example, a user may select to encrypt the name field. In some cases, the user may additionally select an encryption scheme (e.g., deterministic encryption or probabilistic encryption) for the data field. When the data object is received at encryption service 215, a runtime engine may determine whether the data object contains any data designated for encryption. Encryption service 215 may identify the name field, and may initiate encryption of plaintext 210 corresponding to the name field of the data object.

At 274, encryption service 215 may request an encryption key 260 from key cache 225. An encryption key 260 that was recently used may be stored in key cache 225, which may be an example of an application server cache. For example, when encryption service 215 encrypts data using encryption key 260, encryption service 215 may store encryption key 260 in key cache 225. Encryption key 260 may not persist in key cache 225. For example, key cache 225 may flush its storage or remove encryption key 260 based on a cache replacement algorithm (e.g., a least recently used (LRU) cache algorithm). However, in some cases, the cache replacement algorithm may not remove all versions of the encryption key 260 from the database 270 or application cloud 220. For example, when initially storing an encryption key 260 in the key cache 225, or when initially generating an encryption key 260, the system may store one or more copies of the encryption key 260 or indications of how to derive the encryption key 260 (e.g., a user secret 245) in other databases or servers (e.g., for disaster recovery or for repeated key generation without further input from user device 205). Accordingly, removing the encryption key 260 from the key cache 225 may not revoke application cloud 220 access to that encryption key 260. Key cache 225 may identify whether it contains the active encryption key 260 corresponding to the data field to be encrypted (e.g., based on metadata associated with the data object or the data field). If key cache 225 identifies encryption key 260, key cache 225 may send encryption key 260 to encryption service 215 at 276. Otherwise, key cache 225 may send an indication to encryption service 215 that key cache 225 does not have encryption key 260. In some cases, key cache 225 may not send anything to encryption service 215, and encryption service 215 may determine to derive encryption key 260 based on not receiving a response from key cache 225.

At 278, encryption service 215 may send a derivation request to key derivation server 230 based on not receiving encryption key 260 from key cache 225. Key derivation server 230 may include one or more embedded hardware security modules (HSMs) 235, a master secret 240, a user secret 245, and a master salt 250. Embedded HSMs 235 may be examples of computing devices used to secure and manage any encryption keys 260. Master secret 240 and master salt 250 may be generated periodically or aperiodically (e.g., at the start of each new software release). Master secret 240 may be generated based on a master HSM, which may be physically located at a different location than key derivation server 230. User secret 245 may be input by a user or generated on demand based on the embedded HSMs 235. In some cases, by persistently storing user secret 245 at key derivation server 230, the system may limit the ability of a user to revoke access to encrypted data. For example, if user secret 245 is backed up elsewhere in the database system, removing user secret 245 from the key derivation server memory may not stop the system from generating encryption key 260, as the system may access a backed up version of user secret 245 to use as an input. Master secret 240, user secret 245, master salt 250, or any combination of these may be input into a key derivation function 255 (e.g., a password-based key derivation function 2 (PBKDF2)). Based on receiving the derivation request, and master secret 240, user secret 245, master salt 250, or a combination of these, key derivation function 255 may generate an encryption key 260. At 280, key derivation server 230 may send encryption key 260, which itself may be encrypted, to encryption service 215 or key cache 225.

Encryption service 215 may receive encryption key 260 (e.g., either from key cache 225 or key derivation server 230) and may use encryption key 260, along with a random IV to encrypt plaintext 210 into ciphertext 265. Encryption service 215 may then store encryption key 260 in key cache 225. At 282, encryption service 215 may store the data object, including ciphertext 265 for the encrypted data field, in database 270, along with metadata associated with the data field. The associated metadata may include an indication that the data field contains ciphertext 265, an identifier of user secret 245 used to derive encryption key 260, and the random IV used for encryption.

In some cases, data already stored in database 270 may be selected for encryption, re-encryption, or decryption. For example, a user may select to turn encryption on for a data field, where one or more data objects stored in database 270 contain the data field. In other examples, the user or the database may rotate an encryption key 260 (e.g., generate a new active encryption key 260, and archive or revoke an existing encryption key 260) or switch an encryption scheme. In these cases, database 270 may send the data objects or plaintext 210 stored in the data field to application cloud 220 or a database server for encryption, re-encryption, or decryption. Database 270 may send batches of data objects or data fields (e.g., in portioned data chunks or record groups) for encryption, re-encryption, or decryption in order to reduce overhead associated with the encryption process at any one time. These encryption processes may run as a background job, and database 270 or application cloud 220 may limit the processing power or memory allocated for these encryption processes. In some cases, encryption may occur in database 270 or a data center rather than in application cloud 220.

As described above, encryption key 260 may be stored in key cache 225. Although it is noted that encryption key 260 may not persist in key cache 225, encryption key 260 may be retained or recorded on disc, tapes, etc, or the ability of key derivation server 230 to generate encryption key 260 may persist. To prevent encryption key 260 from being persisted in any kind of capacity, the key derivation server 230 may not perform the complete derivation process for encryption key 260. Instead, in some cases, user device 205 may provide encryption key 260 on demand when encryption service 215 needs to encrypt or decrypt a data object. In other cases, user device 205 may transmit a key component 275, while key derivation server 230 may derive a different key component 275. The encryption service 215 may receive the two key components 275, and may derive the encryption key 260 based on the key components. In each case, user device 205 may control access to encryption key 260 and may control and provide the ability to decrypt a data object in application cloud 220 (e.g., by a third party). Additionally, the encryption key 260 or key component 275 provided on demand by user device 205 may not be persisted in memory or backed up in the application cloud. Instead, the application cloud may store the encryption key 260 or key component 275 in volatile memory, such that when the volatile memory is cleared, the application cloud 220 may no longer have the ability to retrieve or derive the encryption key 260.

Figure 3:
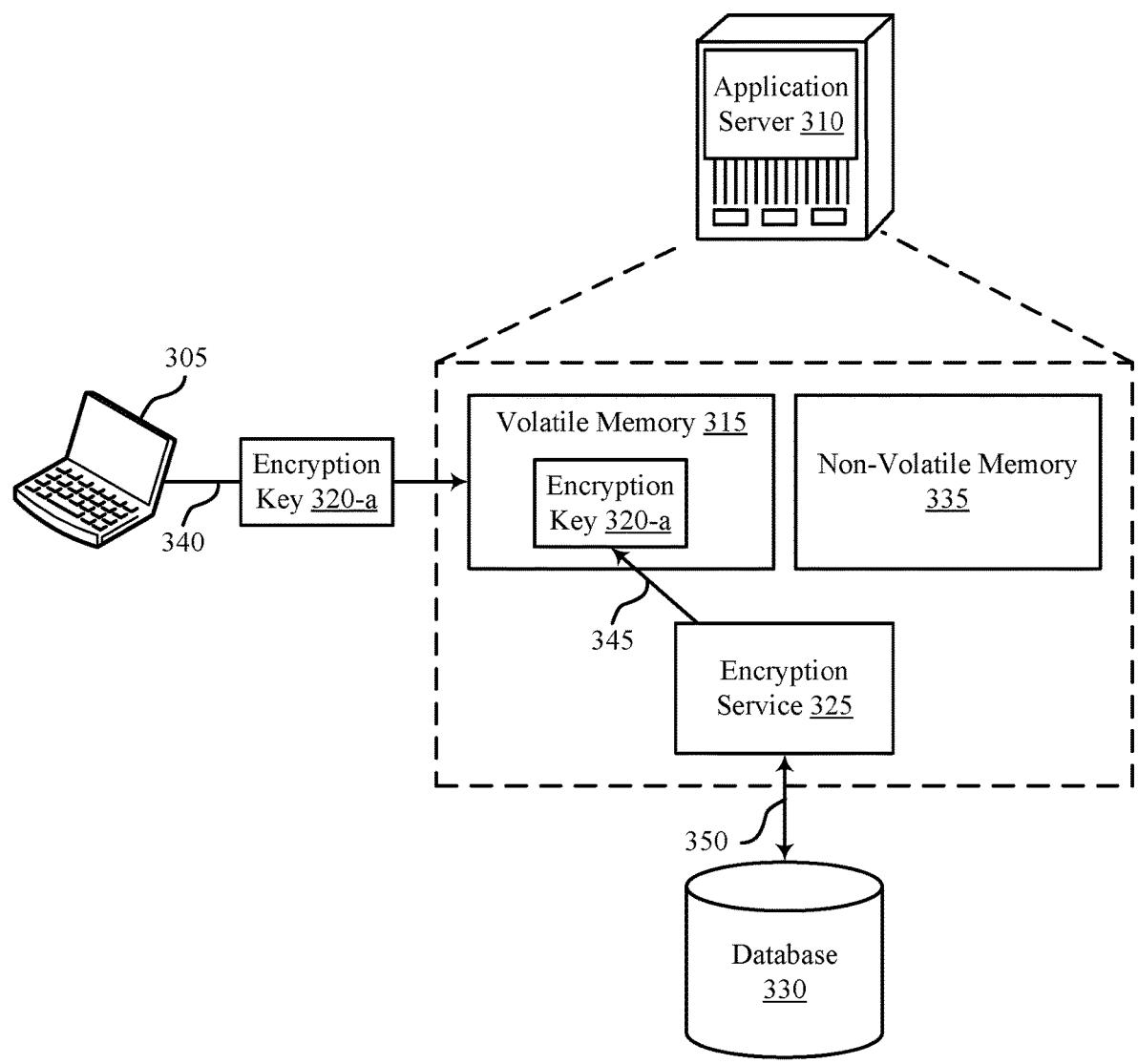

FIG. 3 illustrates an example of an encryption process 300 that supports preventing encryption key recovery by a cloud provider (e.g., by storing an encryption key in volatile memory) in accordance with various aspects of the present disclosure. As described above, encryption process 300 may be initiated by a tenant 305, which may be an example of a cloud client 105 or a contact 110 as described with reference to FIG. 1 or a user device 205 as described with reference to FIG. 2. In other cases, encryption process 300 may be initiated based on a trigger or a scheduled periodicity. Accordingly, an application server 310 may identify encryption process 300, where application server 310 may include similar aspects of application cloud 220 or key derivation server 230 as described with reference to FIG. 2. In some cases, application server 310 may be an example of a single server or a cluster of servers. Encryption process 300 may employ similar techniques as described above with reference to encryption process 200. Encryption process 300 may utilize volatile memory 315 (e.g., non-persistent memory or RAM) of application server 310 for storing an encryption key 320 in order to perform an encryption service 325. While illustrated outside of both volatile and non-volatile memory, it is to be understood that encryption service 325 may include operations or features stored in either type of memory.

Application server 310 may identify an encryption process to perform on a data object or data record. For example, in some cases, tenant 305 may send a data object to database 330 for storage, where the data object includes one or more plaintext fields to be encrypted by encryption service 325 before being stored at database 330. Additionally or alternatively, tenant 305 may attempt to access encrypted data stored in database 330, and encryption service 325 may decrypt the data object from database 330. In other cases, encryption service 325 may perform a key rotation process or an encryption scheme change for a data object. Based on identifying that the data object needs to be encrypted or decrypted, application server 310 may request encryption key 320-a from tenant 305. Accordingly, tenant 305 may provide or supply encryption key 320-a to application server 310 at 340.

Application server 310 may store encryption key 320-a in volatile memory 315, such that if application server 310 restarts or an application associated with application server 310 is closed, encryption key 320-a may be deleted from volatile memory 315. As such, no record or instance of encryption key 320-a may be preserved.

At 345, encryption service 325 may need encryption key 320 to perform an encryption process on a data object or data record. Accordingly, encryption service 325 may directly access encryption key 320-a in volatile memory 315. In some cases, application server 310 may derive an encryption key 320 based on encryption key 320-a, and encryption service 325 may access this derived encryption key 320 in the volatile memory 315. For example, application server 310 may derive the encryption key 320 based on encryption key 320-a and inputs from a separate database or server (e.g., such as a key derivation server 230, as described above with reference to FIG. 2).

Encryption service 325 may encrypt a plaintext field into ciphertext based on encryption key 320-a, and may store the ciphertext in database 330, or a similar persistent storage entity, at 350. Alternatively, encryption service 325 may decrypt a ciphertext field in database 330 based on encryption key 320-a to obtain a plaintext value, and may either store the plaintext value in database 330 or send the result to tenant 305. Additionally or alternatively, encryption service 325 may update a ciphertext field with a new encryption key 320-a based on a key rotation or encryption scheme change. In some cases, application server 310 may perform encryption service 325 and directly transmit or receive the data object to or from database 330.

In some cases, tenant 305 may transmit a key destruction request to application server 310 in order to restart application server 310, clear volatile memory 315, and delete encryption key 320-a. As encryption key 320-a is never stored in non-volatile memory 335, encryption key 320-a may not be persisted across the restart. Accordingly, if tenant 305 initiates a subsequent encryption process, application server 310 may no longer have access to encryption key 320-a, and may request tenant 305 to supply an additional encryption key 320-a on demand to store in volatile memory 315 until the next restart or until removed based on a replacement algorithm. While encryption process 300 illustrates tenant 305 transmitting a full encryption key 320 to application server 310, tenant 305 may alternatively transmit a portion of an encryption key 320 or an encoded encryption key 320 to application server 310, where application server 310 may derive the full encryption key 320 for storage in volatile memory 315.

Figure 4:
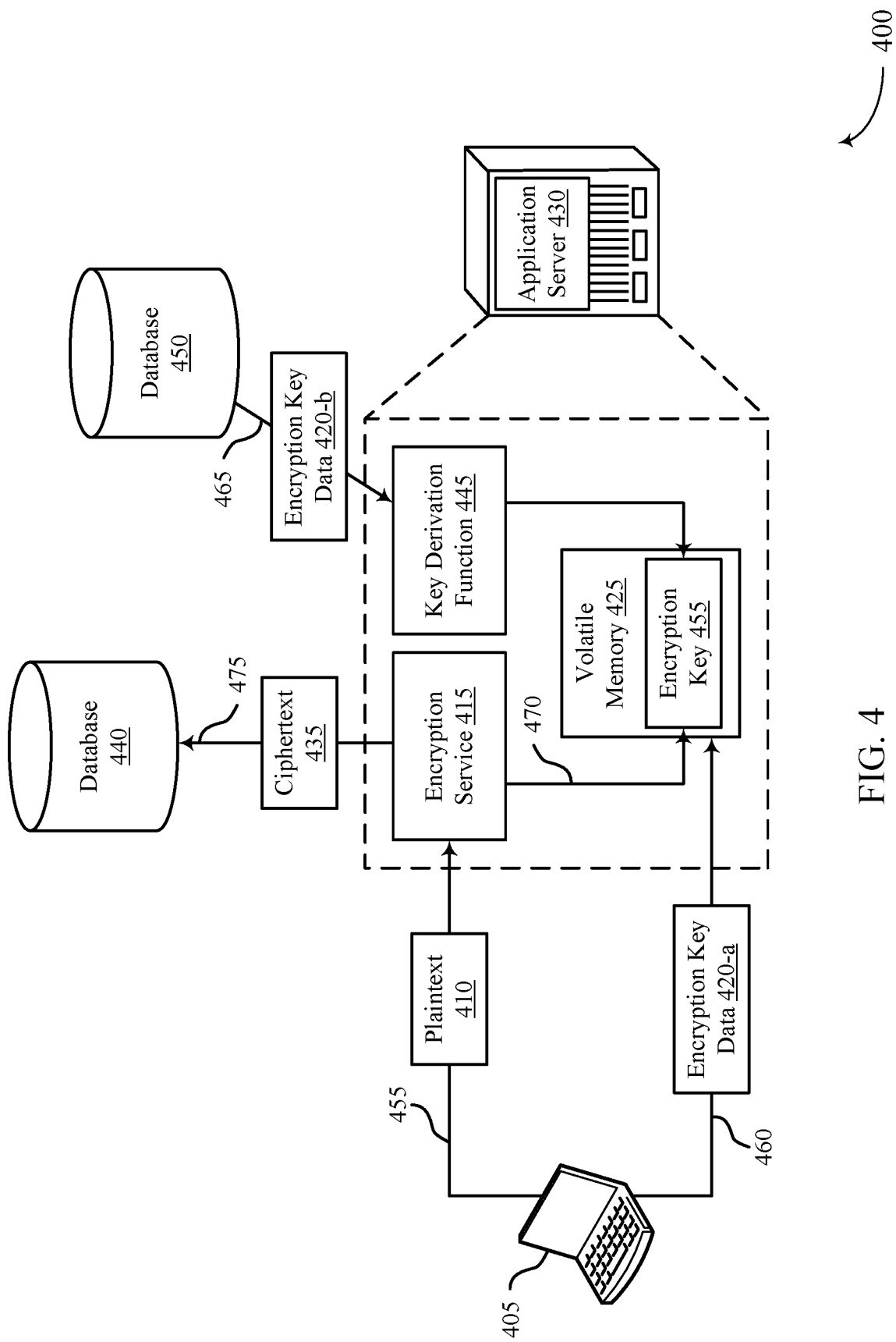

FIG. 4 illustrates an example of an encryption process 400 that supports preventing encryption key recovery by a cloud provider (e.g., by storing an encryption key in volatile memory) in accordance with various aspects of the present disclosure. Encryption process 400 may implement aspects of encryption processes 200 and 300 as described above. Instead of transmitting a full encryption key when requested, a tenant 405 may transmit encryption key data 420-a to an application server 430 so that application server 430 may derive an encryption key 455, where tenant 405 and application server 430 may correspond to respective devices as described with reference to FIG. 3.

At 455, tenant 405 may send a data object to database 440 for storage, where the data object may include plaintext 410. Tenant 405 may further supply encryption key data 420-a to application server 430 at 460 (e.g., based on application server 430 requesting an encryption key from tenant 405). The application server 430 may need the encryption key for performing an encryption service 415, such as encrypting plaintext 410 into ciphertext 435. Alternatively, the encryption service 415 may decrypt ciphertext 435, update ciphertext 435 based on a key rotation or encryption scheme change, or a combination thereof. The application server 430 may store the encryption key data 420-a in volatile memory 425.

In some cases, application server 430 may implement a key derivation function 445 to determine an encryption key 455. For example, tenant 405 and application server 430 may utilize a public-private key process for encryption service 415. In some cases, such a process may be referred to as public-key or asymmetric key cryptography. Encryption key data 420 may include an encryption key or a derivation component of an encryption key (e.g., a tenant secret) wrapped in a public key. For example, tenant 405 may download, identify, or receive a public key, and may encrypt the data encryption key 455 or a fragment of the data encryption key 455 using the public key. Tenant 405 may transmit the encrypted key or encrypted fragment to application server 430. Based on receiving the encryption key data 420-a wrapped in a public key, key derivation function 445 may retrieve a private key stored in a database 450 at 465, or may retrieve the private key from a key derivation server (e.g., separate from the application server 430). Database 450 may be the same as database 440 or may include an embedded HSM as described above with reference to FIG. 2. In some cases, key derivation function 445 may retrieve encryption key data 420-b, such as one or more private key derivation inputs, and may derive the private key from the inputs. Once the private key is obtained, key derivation function 445 may decrypt the public key-encrypted data encryption key 455 or data encryption key fragment with the private key to unwrap encryption key 455 in volatile memory 425. In some cases, the public and private key pair may correspond to a Rivest-Shamir-Adleman (RSA) encryption system, an ElGamal encryption system, or any other private-key encryption system.

Additionally or alternatively, tenant 405 and application server 430 may utilize a key-splitting process for encryption service 415. For example, encryption key data 420-a may include a first fragment of encryption key 455. In some cases, tenant 405 may determine this first fragment based on a tenant secret, a derivation function, or both on the tenant-side (e.g., at the tenant 405). Accordingly, key derivation function 445 may retrieve a second fragment of encryption key 455 (e.g., encryption key data 420-b) stored in database 450 or generated by a server. As described above, database 450 may be the same as database 440 or may include an embedded HSM as described above with reference to FIG. 2. Once both fragments are obtained, key derivation function 445 may derive encryption key 455 based on the two fragments. In some cases, the key-splitting process may involve more than two key fragments.

In any of the cases described above, the encryption key data 420-a and the derived encryption key 455 are stored in volatile memory 425, and are never persisted in the application server 430 or anywhere else in the database system. In some cases, the encryption key data 420-b (e.g., the private key, the second fragment, etc.) may be persisted in the database 450 or the application server 430. If tenant 405 revokes access to encryption key 455 (e.g., based on a user input command), tenant 405 may refrain from providing encryption key data 420-a, thereby preventing encryption key 455 from being derived once the volatile memory 425 is cleared and the encryption key data 420-a purged. For example, an organization operating the database system may not be able to decrypt any encrypted data associated with the encryption key 455 without receiving the encryption key data 420-a again from the tenant. In some cases, revoking access to the encryption key 455 may involve tenant 405 transmitting a command (e.g., based on an input from a user, or a time-to-live (TTL) of the encryption key 455) to the database system to flush volatile memory for one or more servers. In some examples, the database system may flush volatile memory (e.g., by restarting the servers) for all associated servers. In other examples, the database system may identify the servers storing encryption key data 420-a or encryption key 455 in volatile memory, and may flush the volatile memory for these identified servers.

At 470, encryption service 415 may perform an encryption process on plaintext 410 using encryption key 455. Accordingly as described above with reference to FIG. 3, encryption service 415 may directly access encryption key 455 from volatile memory 425. At 475, encryption service 415 may store the resulting ciphertext 435 in database 440.

Figure 5:
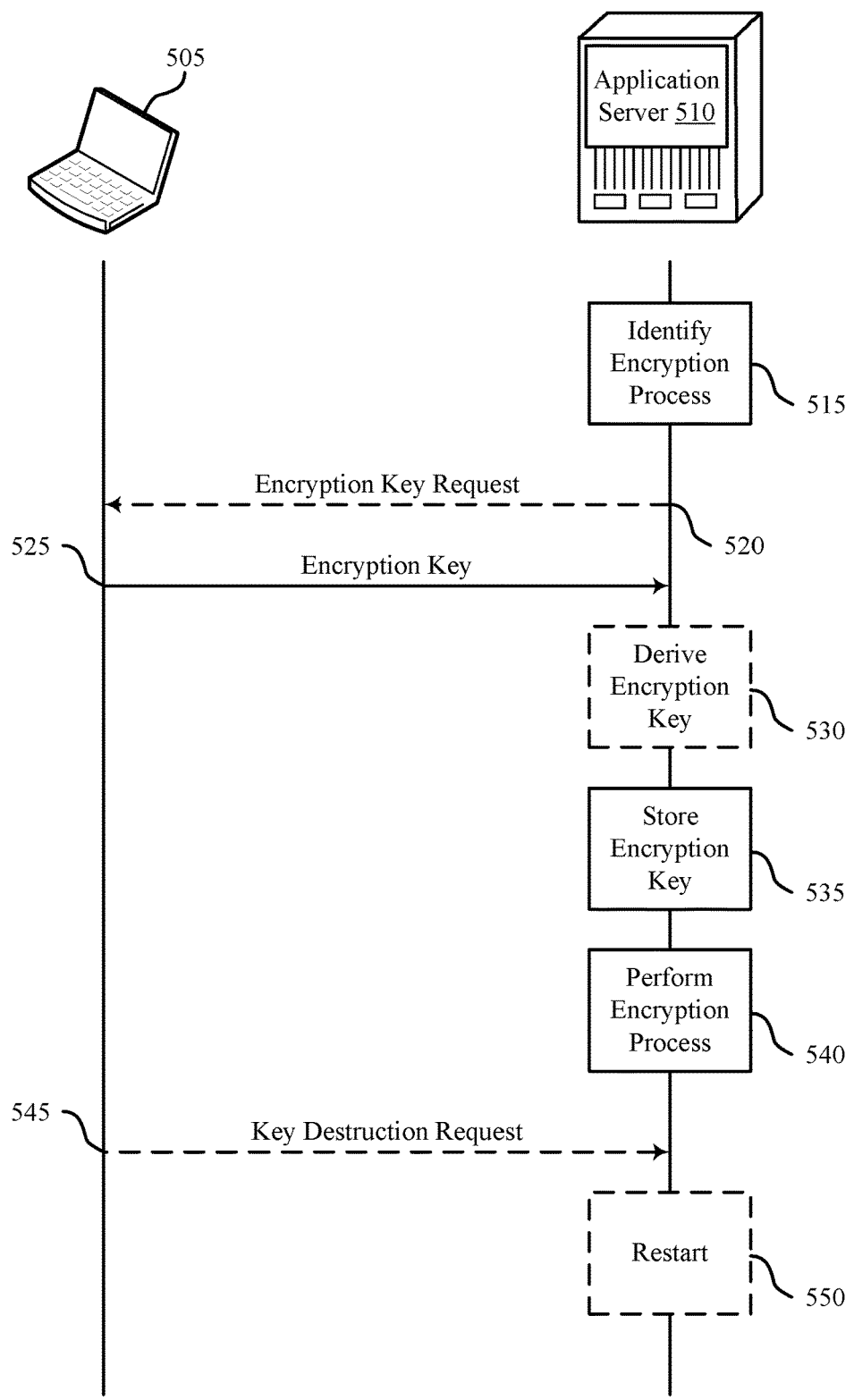
FIG. 5 illustrates an example of a process flow that supports preventing encryption key recovery by a cloud provider in accordance with aspects of the present disclosure.

FIG. 5 illustrates an example of a process flow 500 that supports preventing encryption key recovery by a cloud provider (e.g., through encryption key storage in volatile memory) in accordance with various aspects of the present disclosure. Process flow 500 may include a tenant 505 and an application server 510, which may be examples of respective tenants or user devices and application servers as described above with reference to FIGS. 2 through 4. Application server 510 may store an encryption key specific to tenant 505 in volatile memory, and may directly access the encryption key in the volatile memory in order to perform an encryption process.

In the following description of the process flow 500, the operations between tenant 505 and application server 510 may be performed in different orders or at different times. Certain operations may also be left out of process flow 500, or other operations may be added to process flow 500.

At 515, application server 510 may identify an encryption process to perform on a data object (e.g., one or more data records). In some cases, the encryption process may include encrypting the data object, decrypting the data object, rotating an encryption key for the data object, changing an encryption scheme for the data object, or a combination thereof.

At 520, application server 510 may optionally transmit, to tenant 505, a request for a data encryption key based on identifying the encryption process.

At 525, application server 510 may receive, from tenant 505, the data encryption key corresponding to the encryption process. In some cases, receiving the data encryption key may include receiving the data encryption key wrapped in a public key. Additionally, application server 510 may retrieve, from a database or server (e.g., including an HSM), a private key corresponding to the public key. In some cases, application server 510 may retrieve one or more private key derivation inputs, and may derive the private key based on the inputs. Accordingly, the public key and the private key may correspond to an RSA encryption system, an ElGamal encryption system, or a combination thereof. Additionally or alternatively, in some cases, receiving the data encryption key may include receiving a first fragment of the data encryption key. In these cases, application server 510 may retrieve, from a database or server, a second fragment of the data encryption key.

At 530, application server 510 may derive the data encryption key based on the key information received at 525. For example, if the received data encryption key is wrapped in a public key, application server 510 may derive the data encryption key by unwrapping the data encryption key based on the public key and the corresponding private key (i.e., the private key decrypts the public key-encrypted information to access the data encryption key). In some cases, application server 510 may first derive the private key based on the one or more private key derivation inputs and a private key derivation function. If the first fragment of the data encryption key is received, application server may derive the data encryption key based on the first fragment of the data encryption key and the second fragment of the data encryption key (e.g., using a key derivation function). In some cases, application server 510 may receive a public key-wrapped first fragment of a data encryption key, and may perform both of the above processes to determine the encryption key. In other cases, application server 510 may receive a first fragment of a private key along with a public key-wrapped data encryption key or data encryption key fragment, and may retrieve a second fragment of the private key, derive the private key based on the fragments, and unwrap the data encryption key or data encryption key fragment using the derived private key.

At 535, application server 510 may store the data encryption key in volatile memory (e.g., non-persistent memory). Additionally, application server 510 may store derivation components of the data encryption key (e.g., the wrapped data encryption key, the first fragment of the data encryption key, etc.) in volatile memory.

At 540, application server 510 may perform the encryption process on the data object by accessing the data encryption key from the volatile memory (e.g., without ever storing the data encryption key in persistent memory).

In some cases, at 545, application server 510 may receive, from tenant 505, a key destruction request. At 550, application server 510 may restart. In some cases, restarting application server 510 may be based on the key destruction request received at 545. After restarting, application server 510 may identify an additional encryption process to perform, where the data encryption key corresponds to the additional encryption process. Accordingly, application server 510 may identify that the data encryption key is not stored in the volatile memory or in non-volatile memory of the application server after restarting.

Figure 6:
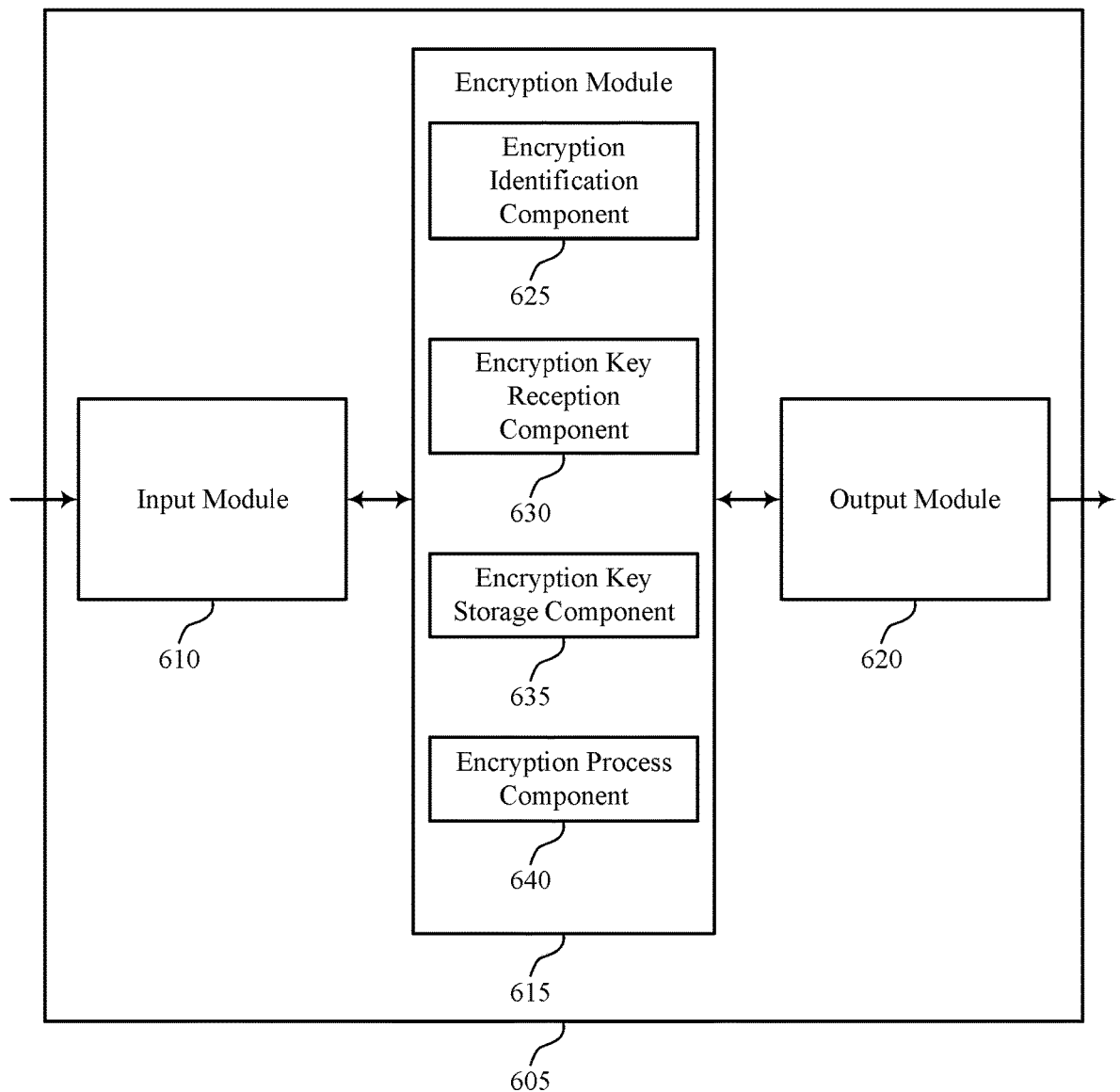
FIGS. 6 and 7 show block diagrams of a device that supports preventing encryption key recovery by a cloud provider in accordance with aspects of the present disclosure.

FIG. 6 shows a block diagram 600 of an apparatus 605 that supports preventing encryption key recovery by a cloud provider (e.g., through encryption key storage in volatile memory) in accordance with aspects of the present disclosure. Apparatus 605 may include input module 610, encryption module 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Encryption module 615 may be an example of aspects of the encryption module 815 described with reference to FIG. 8.

Encryption module 615 and/or at least some of its various sub-components may be implemented in hardware, software executed by a processor, firmware, or any combination thereof. If implemented in software executed by a processor, the functions of the encryption module 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The encryption module 615 and/or at least some of its various sub-components may be physically located at various positions, including being distributed such that portions of functions are implemented at different physical locations by one or more physical devices. In some examples, encryption module 615 and/or at least some of its various sub-components may be a separate and distinct component in accordance with various aspects of the present disclosure. In other examples, encryption module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Encryption module 615 may also include encryption identification component 625, encryption key reception component 630, encryption key storage component 635, and encryption process component 640.

Encryption identification component 625 may identify an encryption process to perform on a data object. Encryption key reception component 630 may receive, from a tenant, a data encryption key corresponding to the encryption process. Encryption key storage component 635 may store the data encryption key in volatile memory of the application server. Encryption process component 640 may perform the encryption process on the data object by accessing the data encryption key from the volatile memory. In some cases, the encryption process includes encrypting the data object, decrypting the data object, a key rotation process for the data object, an encryption scheme change for the data object, or a combination thereof.

Figure 7:
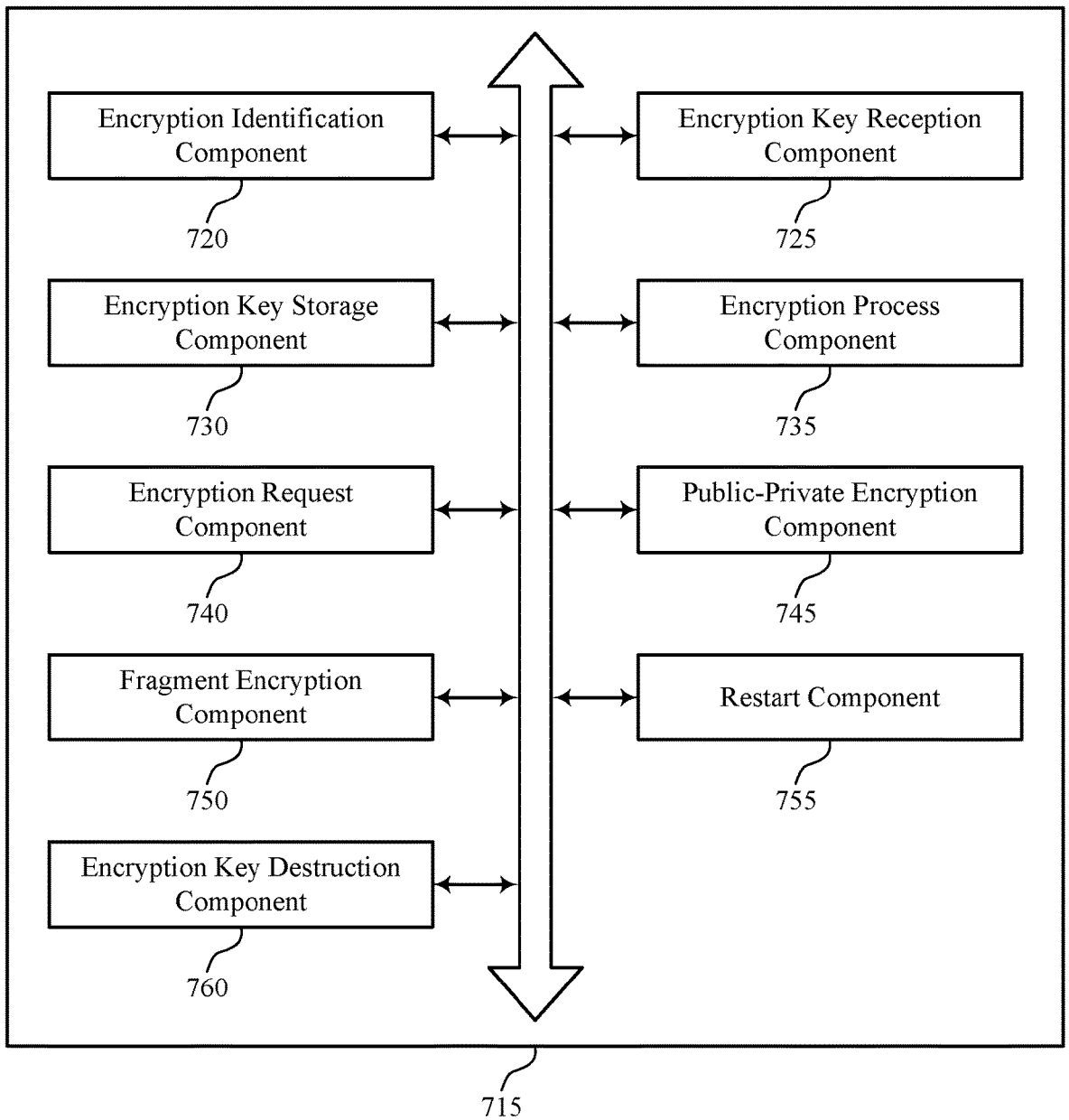

FIG. 7 shows a block diagram 700 of an encryption module 715 that supports preventing encryption key recovery by a cloud provider (e.g., through encryption key storage in volatile memory) in accordance with aspects of the present disclosure. The encryption module 715 may be an example of aspects of an encryption module 615 or 815 described with reference to FIGS. 6 and 8. The encryption module 715 may include encryption identification component 720, encryption key reception component 725, encryption key storage component 730, encryption process component 735, encryption request component 740, public-private encryption component 745, fragment encryption component 750, restart component 755, and encryption key destruction component 760. Each of these modules may communicate, directly or indirectly, with one another (e.g., via one or more buses).

Encryption identification component 720 may identify an encryption process to perform on a data object. Additionally, in some cases, encryption identification component 720 identify an additional encryption process to perform, where a data encryption key corresponds to the additional encryption process.

Encryption key reception component 725 may receive, from a tenant, a data encryption key corresponding to the encryption process.

Encryption key storage component 730 may store the data encryption key in volatile memory of the application server. In some cases, encryption key storage component 730 may identify that the data encryption key is not stored in the volatile memory or in non-volatile memory of the application server.

Encryption process component 735 may perform the encryption process on the data object by accessing the data encryption key from the volatile memory. In some cases, the encryption process includes encrypting the data object, decrypting the data object, a key rotation process for the data object, an encryption scheme change for the data object, or a combination thereof.

Encryption request component 740 may transmit, to the tenant, a request for the data encryption key based on identifying the encryption process.

In some cases, receiving the data encryption key may include receiving the data encryption key wrapped in a public key. Accordingly, public-private encryption component 745 may retrieve, from a database, a private key corresponding to the public key and unwrap the data encryption key based on the public key and the corresponding private key. In some cases, retrieving the private key further includes retrieving one or more private key derivation inputs, and public-private encryption component 745 may derive the private key based on the private key derivation inputs and a private key derivation function. In some cases, the public key and the private key may correspond to an RSA encryption system, an ElGamal encryption system, or a combination thereof.

In some cases, receiving the data encryption key may include receiving a first fragment of the data encryption key. Accordingly, fragment encryption component 750 may retrieve, from a database, a second fragment of the data encryption key and derive the data encryption key based on the first fragment of the data encryption key and the second fragment of the data encryption key.

Restart component 755 may restart the application server.

Encryption key destruction component 760 may receive, from the tenant, a key destruction request, where restarting the application server may be based on the key destruction request.

Figure 8:
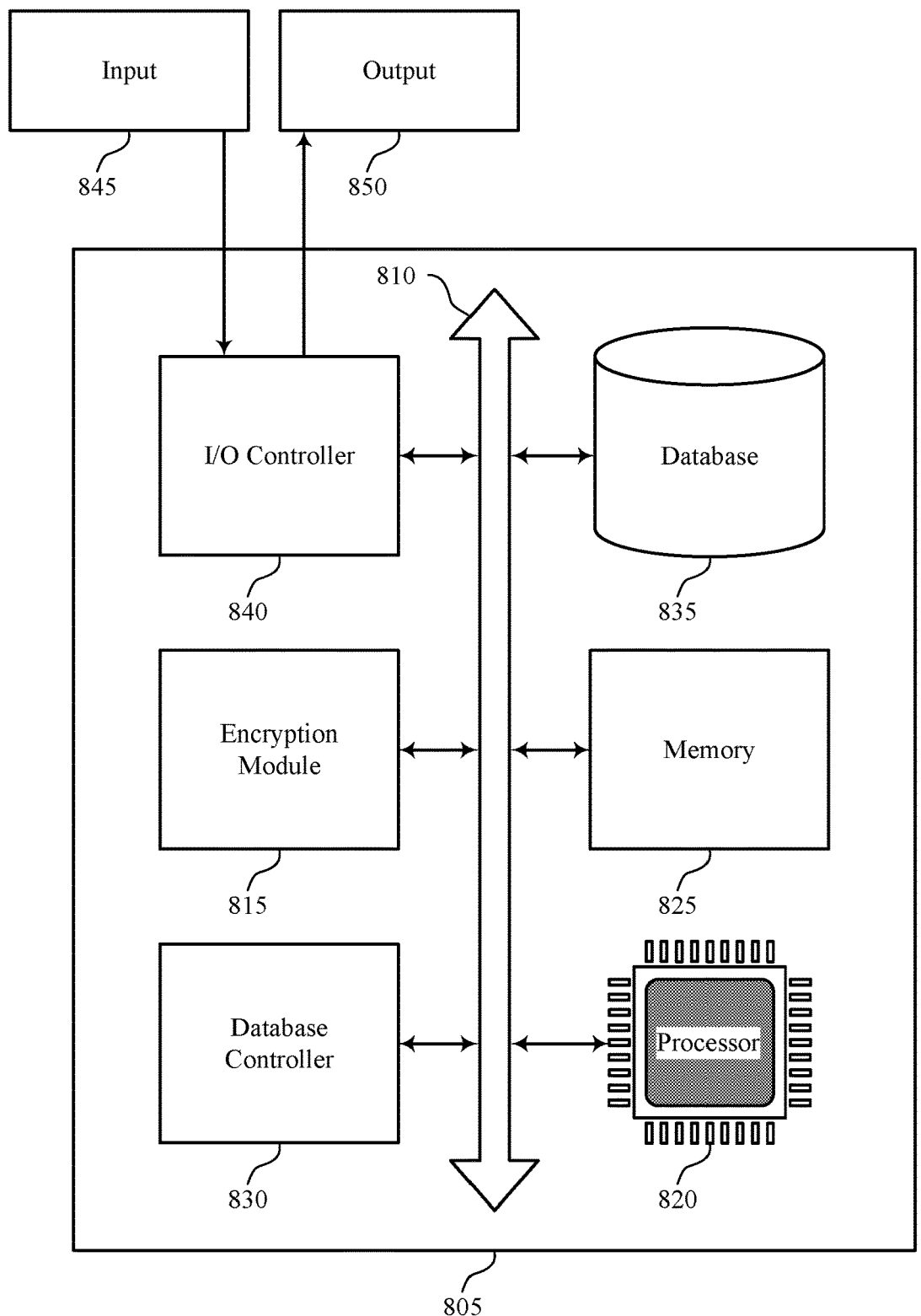
FIG. 8 illustrates a block diagram of a system including a device that supports preventing encryption key recovery by a cloud provider in accordance with aspects of the present disclosure.

FIG. 8 shows a diagram of a system 800 including a device 805 that supports preventing encryption key recovery by a cloud provider (e.g., through encryption key storage in volatile memory) in accordance with aspects of the present disclosure. Device 805 may be an example of or include the components of an application server as described above, e.g., with reference to FIGS. 3, 4, and 5. Device 805 may include components for bi-directional data communications including components for transmitting and receiving communications, including encryption module 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting preventing encryption key recovery by a cloud provider and/or encryption key storage in volatile memory). In some cases, encryption module 815 may be located in processor 820. Alternatively, if an HSM is utilized, encryption module 815 and processor 820 may be separate devices.

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
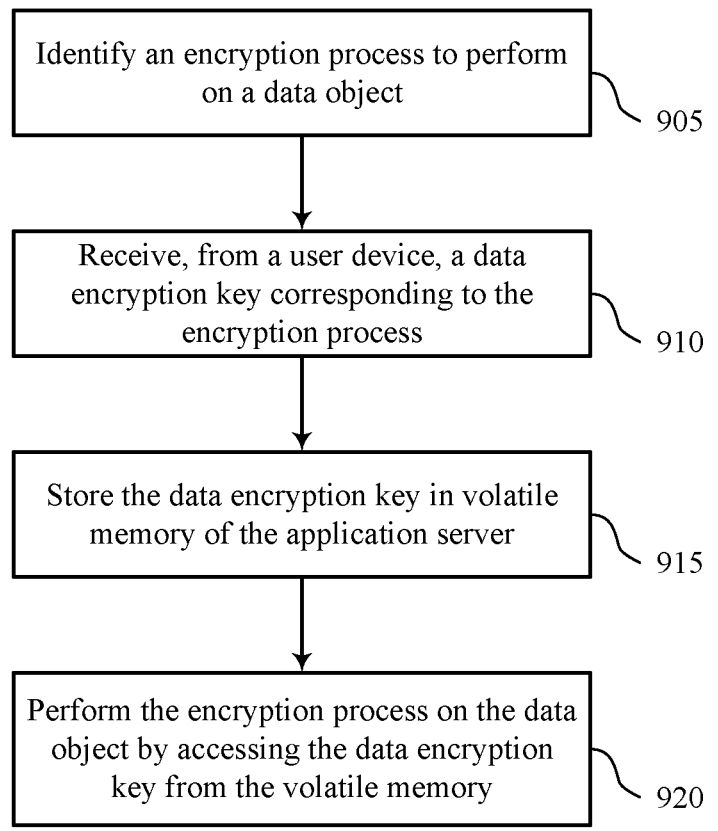
FIGS. 9 through 12 illustrate methods for preventing encryption key recovery by a cloud provider in accordance with aspects of the present disclosure.

FIG. 9 shows a flowchart illustrating a method 900 for preventing encryption key recovery by a cloud provider (e.g., through encryption key storage in volatile memory) in accordance with aspects of the present disclosure. The operations of method 900 may be implemented by an application server 310, 430, or 510 as described above, e.g., with reference to FIGS. 3, 4, and 5. For example, the operations of method 900 may be performed by an encryption module as described with reference to FIGS. 6 through 8. In some examples, a device may execute a set of codes to control the functional elements of the device to perform the functions described below. Additionally or alternatively, the device may perform aspects of the functions described below using special-purpose hardware.

At 905 the device may identify an encryption process to perform on a data object. The operations of 905 may be performed according to the methods described herein. In certain examples, aspects of the operations of 905 may be performed by an encryption identification component as described with reference to FIGS. 6 through 8.

At 910 the device may receive, from a tenant, a data encryption key corresponding to the encryption process. The operations of 910 may be performed according to the methods described herein. In certain examples, aspects of the operations of 910 may be performed by an encryption key reception component as described with reference to FIGS. 6 through 8.

At 915 the device may store the data encryption key in volatile memory of the application server. The operations of 915 may be performed according to the methods described herein. In certain examples, aspects of the operations of 915 may be performed by an encryption key storage component as described with reference to FIGS. 6 through 8.

At 920 the device may perform the encryption process on the data object by accessing the data encryption key from the volatile memory. The operations of 920 may be performed according to the methods described herein. In certain examples, aspects of the operations of 920 may be performed by an encryption process component as described with reference to FIGS. 6 through 8.

Figure 10:
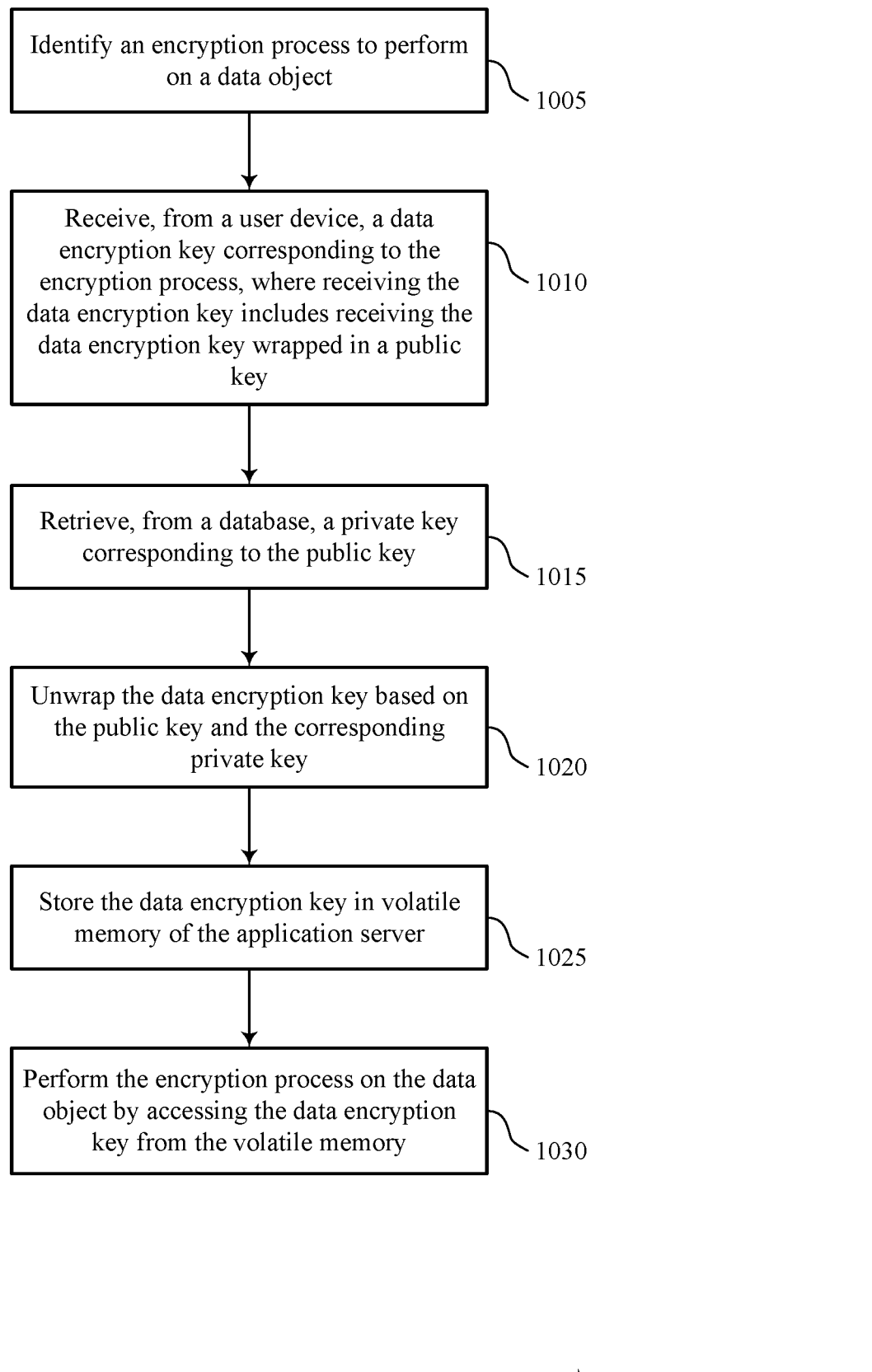

FIG. 10 shows a flowchart illustrating a method 1000 for preventing encryption key recovery by a cloud provider (e.g., through encryption key storage in volatile memory) in accordance with aspects of the present disclosure. The operations of method 1000 may be implemented by an application server 310, 430, or 510 as described above, e.g., with reference to FIGS. 3, 4, and 5. For example, the operations of method 1000 may be performed by an encryption module as described with reference to FIGS. 6 through 8. In some examples, a device may execute a set of codes to control the functional elements of the device to perform the functions described below. Additionally or alternatively, the device may perform aspects of the functions described below using special-purpose hardware.

At 1005 the device may identify an encryption process to perform on a data object. The operations of 1005 may be performed according to the methods described herein. In certain examples, aspects of the operations of 1005 may be performed by an encryption identification component as described with reference to FIGS. 6 through 8.

At 1010 the device may receive, from a tenant, a data encryption key corresponding to the encryption process. In some cases, receiving the data encryption key may include receiving the data encryption key wrapped in a public key. The operations of 1010 may be performed according to the methods described herein. In certain examples, aspects of the operations of 1010 may be performed by an encryption key reception component as described with reference to FIGS. 6 through 8. Additionally, aspects of the operations of 1010 may be performed by a public-private encryption component as described with reference to FIGS. 6 through 8.

At 1015 the device may retrieve, from a database, a private key corresponding to the public key. The operations of 1015 may be performed according to the methods described herein. In certain examples, aspects of the operations of 1015 may be performed by a public-private encryption component as described with reference to FIGS. 6 through 8.

At 1020 the device may unwrap the data encryption key based on the public key and the corresponding private key. The operations of 1020 may be performed according to the methods described herein. In certain examples, aspects of the operations of 1020 may be performed by a public-private encryption component as described with reference to FIGS. 6 through 8.

At 1025 the device may store the data encryption key in volatile memory of the application server. The operations of 1025 may be performed according to the methods described herein. In certain examples, aspects of the operations of 1025 may be performed by an encryption key storage component as described with reference to FIGS. 6 through 8.

At 1030 the device may perform the encryption process on the data object by accessing the data encryption key from the volatile memory. The operations of 1030 may be performed according to the methods described herein. In certain examples, aspects of the operations of 1030 may be performed by an encryption process component as described with reference to FIGS. 6 through 8.

Figure 11:
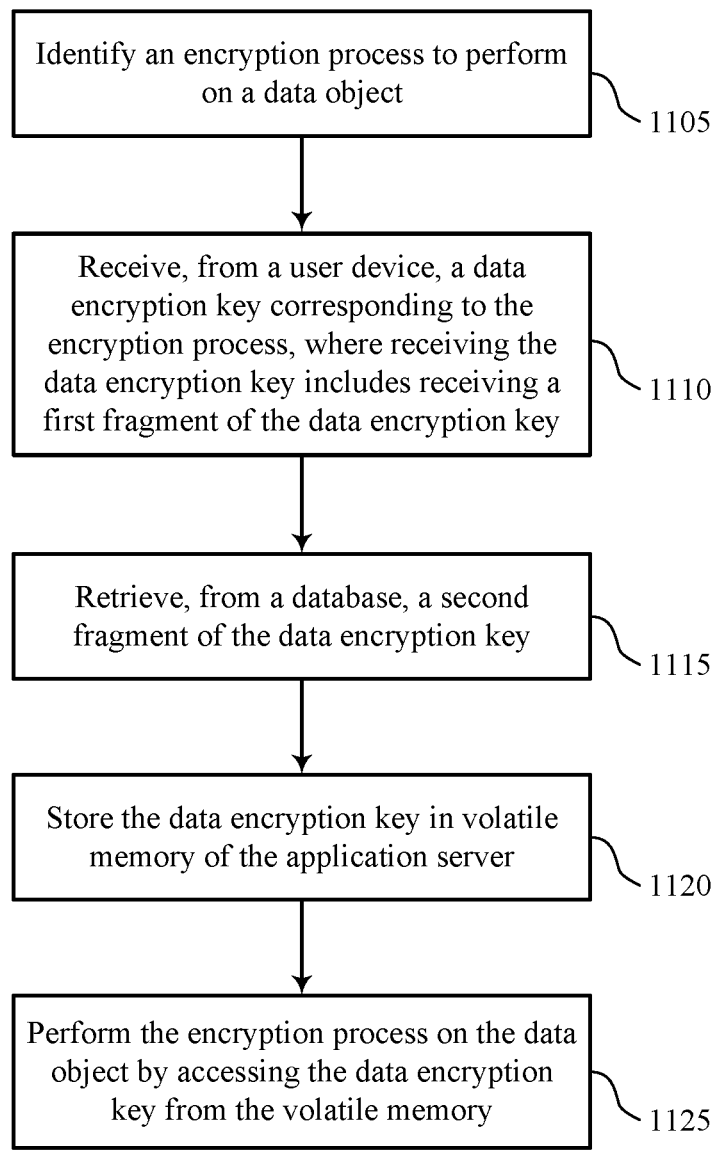

FIG. 11 shows a flowchart illustrating a method 1100 for preventing encryption key recovery by a cloud provider (e.g., through encryption key storage in volatile memory) in accordance with aspects of the present disclosure. The operations of method 1100 may be implemented by an application server 310, 430, or 510 as described above, e.g., with reference to FIGS. 3, 4, and 5. For example, the operations of method 1100 may be performed by an encryption module as described with reference to FIGS. 6 through 8. In some examples, a device may execute a set of codes to control the functional elements of the device to perform the functions described below. Additionally or alternatively, the device may perform aspects of the functions described below using special-purpose hardware.

At 1105 the device may identify an encryption process to perform on a data object. The operations of 1105 may be performed according to the methods described herein. In certain examples, aspects of the operations of 1105 may be performed by an encryption identification component as described with reference to FIGS. 6 through 8.

At 1110 the device may receive, from a tenant, a data encryption key corresponding to the encryption process. In some cases, receiving the data encryption key may include receiving a first fragment of the data encryption key. The operations of 1110 may be performed according to the methods described herein. In certain examples, aspects of the operations of 1110 may be performed by an encryption key reception component as described with reference to FIGS. 6 through 8. Additionally, aspects of the operations of 1110 may be performed by a fragment encryption component as described with reference to FIGS. 6 through 8.

At 1115 the device may retrieve, from a database, a second fragment of the data encryption key. The operations of 1115 may be performed according to the methods described herein. In certain examples, aspects of the operations of 1115 may be performed by a fragment encryption component as described with reference to FIGS. 6 through 8.

At 1120 the device may store the data encryption key in volatile memory of the application server. The operations of 1120 may be performed according to the methods described herein. In certain examples, aspects of the operations of 1120 may be performed by an encryption key storage component as described with reference to FIGS. 6 through 8.

At 1125 the device may perform the encryption process on the data object by accessing the data encryption key from the volatile memory. The operations of 1125 may be performed according to the methods described herein. In certain examples, aspects of the operations of 1125 may be performed by an encryption process component as described with reference to FIGS. 6 through 8.

Figure 12:
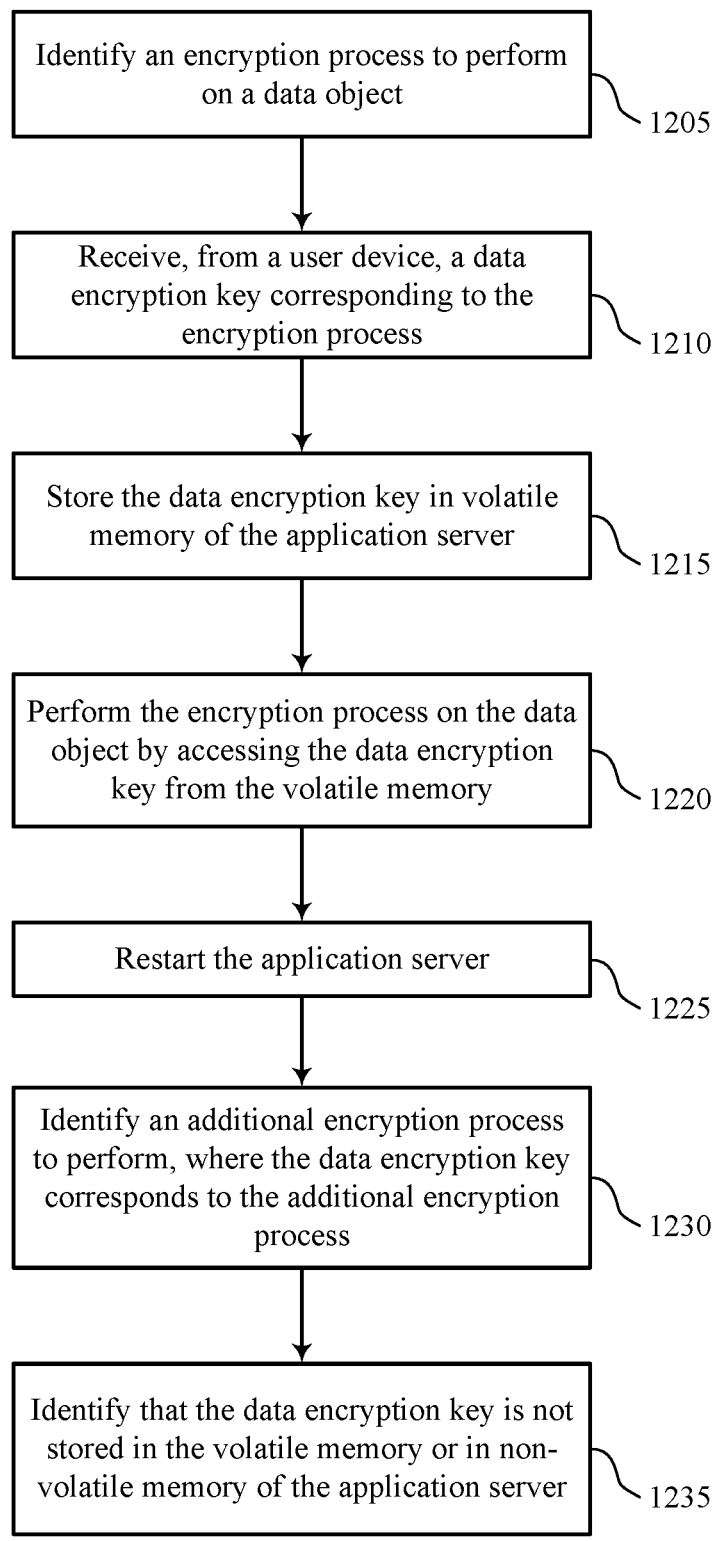

FIG. 12 shows a flowchart illustrating a method 1200 for preventing encryption key recovery by a cloud provider (e.g., through encryption key storage in volatile memory) in accordance with aspects of the present disclosure. The operations of method 1200 may be implemented by an application server 310, 430, or 510 as described above, e.g., with reference to FIGS. 3, 4, and 5. For example, the operations of method 1200 may be performed by an encryption module as described with reference to FIGS. 6 through 8. In some examples, a device may execute a set of codes to control the functional elements of the device to perform the functions described below. Additionally or alternatively, the device may perform aspects of the functions described below using special-purpose hardware.

At 1205 the device may identify an encryption process to perform on a data object. The operations of 1205 may be performed according to the methods described herein. In certain examples, aspects of the operations of 1205 may be performed by an encryption identification component as described with reference to FIGS. 6 through 8.

At 1210 the device may receive, from a tenant, a data encryption key corresponding to the encryption process. The operations of 1210 may be performed according to the methods described herein. In certain examples, aspects of the operations of 1210 may be performed by an encryption key reception component as described with reference to FIGS. 6 through 8.

At 1215 the device may store the data encryption key in volatile memory of the application server. The operations of 1215 may be performed according to the methods described herein. In certain examples, aspects of the operations of 1215 may be performed by an encryption key storage component as described with reference to FIGS. 6 through 8.

At 1220 the device may perform the encryption process on the data object by accessing the data encryption key from the volatile memory. The operations of 1220 may be performed according to the methods described herein. In certain examples, aspects of the operations of 1220 may be performed by an encryption process component as described with reference to FIGS. 6 through 8.

At 1225 the device may restart the application server. The operations of 1225 may be performed according to the methods described herein. In certain examples, aspects of the operations of 1225 may be performed by a restart component as described with reference to FIGS. 6 through 8.

At 1230 the device may identify an additional encryption process to perform, where the data encryption key corresponds to the additional encryption process. The operations of 1230 may be performed according to the methods described herein. In certain examples, aspects of the operations of 1230 may be performed by an encryption identification component as described with reference to FIGS. 6 through 8.

At 1235 the device may identify that the data encryption key is not stored in the volatile memory or in non-volatile memory of the application server (e.g., based on restarting the application server). The operations of 1235 may be performed according to the methods described herein. In certain examples, aspects of the operations of 1235 may be performed by an encryption key storage component as described with reference to FIGS. 6 through 8.

A method of encryption key storage at an application server is described. The method may include identifying an encryption process to perform on a data object, receiving, from a tenant, a data encryption key corresponding to the encryption process, storing the data encryption key in volatile memory of the application server, and performing the encryption process on the data object by accessing the data encryption key from the volatile memory.

An apparatus for encryption key storage at an application server is described. The apparatus may include a processor, memory in electronic communication with the processor, and instructions stored in the memory. The instructions may be operable to cause the processor to identify an encryption process to perform on a data object, receive, from a tenant, a data encryption key corresponding to the encryption process, store the data encryption key in volatile memory of the application server, and perform the encryption process on the data object by accessing the data encryption key from the volatile memory.

A non-transitory computer-readable medium for encryption key storage at an application server is described. The non-transitory computer-readable medium may include instructions operable to cause a processor to identify an encryption process to perform on a data object, receive, from a tenant, a data encryption key corresponding to the encryption process, store the data encryption key in volatile memory of the application server, and perform the encryption process on the data object by accessing the data encryption key from the volatile memory.

Some examples of the method, apparatus, and non-transitory computer-readable medium described above may further include processes, features, means, or instructions for transmitting, to the tenant, a request for the data encryption key based on identifying the encryption process.

Some examples of the method, apparatus, and non-transitory computer-readable medium described above may further include processes, features, means, or instructions for retrieving, from a database, a private key corresponding to a public key, where receiving the data encryption key includes receiving the data encryption key wrapped in the public key. Some examples of the method, apparatus, and non-transitory computer-readable medium described above may further include processes, features, means, or instructions for unwrapping the data encryption key based on the public key and the corresponding private key.

In some examples of the method, apparatus, and non-transitory computer-readable medium described above, retrieving the private key further includes retrieving one or more private key derivation inputs. Some examples of the method, apparatus, and non-transitory computer-readable medium described above may further include processes, features, means, or instructions for deriving the private key based on the private key derivation inputs and a private key derivation function.

In some examples of the method, apparatus, and non-transitory computer-readable medium described above, the public key and the private key correspond to an RSA encryption system, an ElGamal encryption system, or a combination thereof.

Some examples of the method, apparatus, and non-transitory computer-readable medium described above may further include processes, features, means, or instructions for retrieving, from a database, a second fragment of the data encryption key, where receiving the data encryption key includes receiving a first fragment of the data encryption key.

Some examples of the method, apparatus, and non-transitory computer-readable medium described above may further include processes, features, means, or instructions for deriving the data encryption key based on the first fragment of the data encryption key and the second fragment of the data encryption key.

Some examples of the method, apparatus, and non-transitory computer-readable medium described above may further include processes, features, means, or instructions for restarting the application server. Some examples of the method, apparatus, and non-transitory computer-readable medium described above may further include processes, features, means, or instructions for identifying an additional encryption process to perform, where the data encryption key corresponds to the additional encryption process. Some examples of the method, apparatus, and non-transitory computer-readable medium described above may further include processes, features, means, or instructions for identifying that the data encryption key may be not stored in the volatile memory or in non-volatile memory of the application server.

Some examples of the method, apparatus, and non-transitory computer-readable medium described above may further include processes, features, means, or instructions for receiving, from the tenant, a key destruction request, where restarting the application server may be based on the key destruction request.

In some examples of the method, apparatus, and non-transitory computer-readable medium described above, the encryption process includes encrypting the data object, decrypting the data object, a key rotation process for the data object, an encryption scheme change for the data object, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for encryption key storage at an application server, comprising:
    identifying, at the application server, an encryption process to perform on a first data object;
    receiving, at the application server, from a user associated with a user device, data encryption key data corresponding to the encryption process;
    deriving, at the application server, a data encryption key based on the data encryption key data and a second fragment of the data encryption key retrieved from a database;
    storing the data encryption key data and the data encryption key in volatile memory of the application server;
    performing, at the application server, the encryption process on the first data object by accessing the data encryption key from the volatile memory;
    restarting, at the application server and in response to receiving a key destruction request from the user, the application server, wherein the restarting the application server removes the data encryption key data and the data encryption key from the volatile memory; and
    receiving, at the application server, from the user, the data encryption key data after the restarting the application server, wherein after the restarting the application server, the application server lacks an ability to derive the data encryption key until receiving the data encryption key data from the user.

2. The method of claim 1, further comprising:
    transmitting, to the user, a request for the data encryption key data based at least in part on the identifying the encryption process.

3. The method of claim 1, wherein the receiving the data encryption key data comprises receiving the data encryption key data wrapped in a public key, the method further comprising:
    retrieving, from the database, a private key corresponding to the public key; and
    unwrapping the data encryption key data based at least in part on the public key and the corresponding private key.

4. The method of claim 3, wherein the retrieving the private key further comprises:
    retrieving one or more private key derivation inputs; and
    deriving the private key based at least in part on the private key derivation inputs and a private key derivation function.

5. The method of claim 3, wherein the public key and the private key correspond to a Rivest-Shamir-Adleman (RSA) encryption system, an ElGamal encryption system, or a combination thereof.

6. The method of claim 1, wherein the receiving the data encryption key data comprises receiving a first fragment of the data encryption key.

7. The method of claim 6, wherein the deriving the data encryption key comprises:
    deriving the data encryption key based at least in part on the first fragment of the data encryption key and the second fragment of the data encryption key.

8. The method of claim 1, wherein the encryption process comprises encrypting the first data object, decrypting the first data object, a key rotation process for the first data object, an encryption scheme change for the first data object, or a combination thereof.

9. The method of claim 1, further comprising:
    failing to derive the data encryption key based at least in part on removing the data encryption key data and the data encryption key from the volatile memory.

10. The method of claim 1, further comprising:
    transmitting, to the user, a request for additional data encryption key data corresponding to an additional encryption process to perform on a second data object based at least in part on the restarting the application server.

11. The method of claim 10, further comprising:
    receiving, from the user, the additional data encryption key data corresponding to the additional encryption process based at least in part on the request;
    deriving an additional data encryption key based on the additional data encryption key data and an additional second fragment of the additional data encryption key retrieved from a database;
    storing the additional data encryption key data and the additional data encryption key in the volatile memory of the application server; and
    performing the additional encryption process on the second data object by accessing the additional data encryption key from the volatile memory, wherein the additional encryption process allows access to the second data object by decrypting the second data object using the additional data encryption key.

12. An apparatus for encryption key storage at an application server, comprising:
    a processor;
    memory in electronic communication with the processor; and
    instructions stored in the memory and executable by the processor to cause the apparatus to:

identify, at the application server, an encryption process to perform on a first data object;

receive, at the application server, from a user associated with a user device, data encryption key data corresponding to the encryption process;

derive, at the application server, a data encryption key based on the data encryption key data and a second fragment of the data encryption key retrieved from a database;

store the data encryption key data and the data encryption key in volatile memory of the application server;

perform, at the application server, the encryption process on the first data object by accessing the data encryption key from the volatile memory;

restart, at the application server and in response to receiving a key destruction request from the user, the application server, wherein the restarting the application server removes the data encryption key data and the data encryption key from the volatile memory; and receive, at the application server, from the user, the data encryption key data after the restarting the application server, wherein after the restarting the application server, the application server lacks an ability to derive the data encryption key until receiving the data encryption key data from the user.

13. The apparatus of claim 12, wherein the data encryption key data is received wrapped in a public key and the instructions are further executable by the processor to cause the apparatus to:

retrieve, from the database, a private key corresponding to the public key; and unwrap the data encryption key based at least in part on the public key and the corresponding private key.

14. The apparatus of claim 12, wherein the data encryption key data is received as a first fragment of the data encryption key.

15. The apparatus of claim 14, wherein the deriving the data encryption key comprises:

deriving the data encryption key based at least in part on the first fragment of the data encryption key and the second fragment of the data encryption key.

16. A non-transitory computer-readable medium storing code for encryption key storage at an application server, the code comprising instructions executable by a processor to:

identify, at the application server, an encryption process to perform on a first data object;

receive, at the application server, from a user associated with a user device, data encryption key data corresponding to the encryption process;

derive, at the application server, a data encryption key based on the data encryption key data and a second fragment of the data encryption key retrieved from a database;

store the data encryption key data and the data encryption key in volatile memory of the application server;

perform, at the application server, the encryption process on the first data object by accessing the data encryption key from the volatile memory;

restart, at the application server and in response to receiving a key destruction request from the user, the application server, wherein the restarting the application server removes the data encryption key data and the data encryption key from the volatile memory; and receive, at the application server, from the user, the data encryption key data after the restarting the application server, wherein after the restarting the application server, the application server lacks an ability to derive the data encryption key until receiving the data encryption key data from the user.

17. The non-transitory computer-readable medium of claim 16, wherein the data encryption key data is received wrapped in a public key and the instructions are further executable by the processor to:

retrieve, from the database, a private key corresponding to the public key; and unwrap the data encryption key based at least in part on the public key and the corresponding private key.

18. The non-transitory computer-readable medium of claim 16, wherein the data encryption key data is received as a first fragment of the data encryption key.

19. The non-transitory computer-readable medium of claim 18, wherein deriving the data encryption key comprises:

deriving the data encryption key based at least in part on the first fragment of the data encryption key and the second fragment of the data encryption key.

* * * * *